INVENTORS
WILLIAM R. MORELAND
ALONZO W. PHILLIPS
BY
AGENT

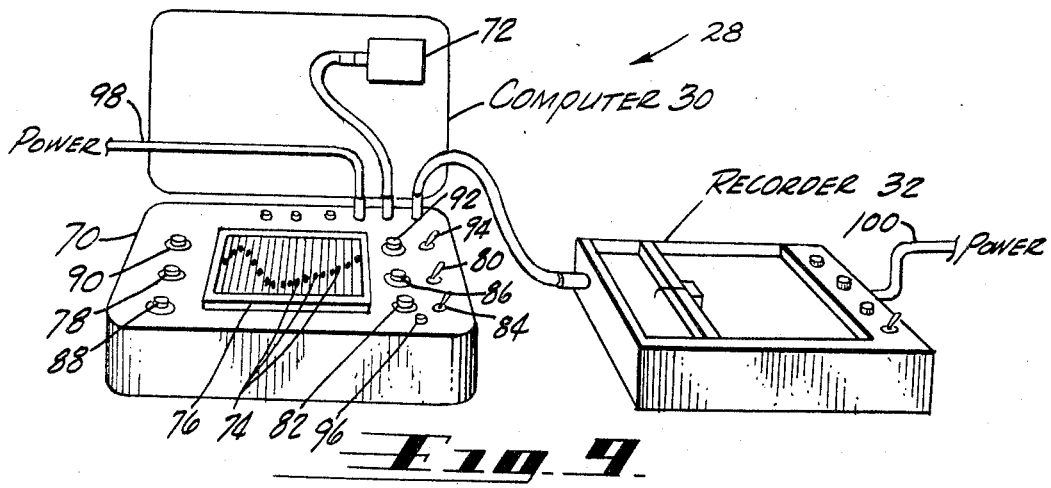
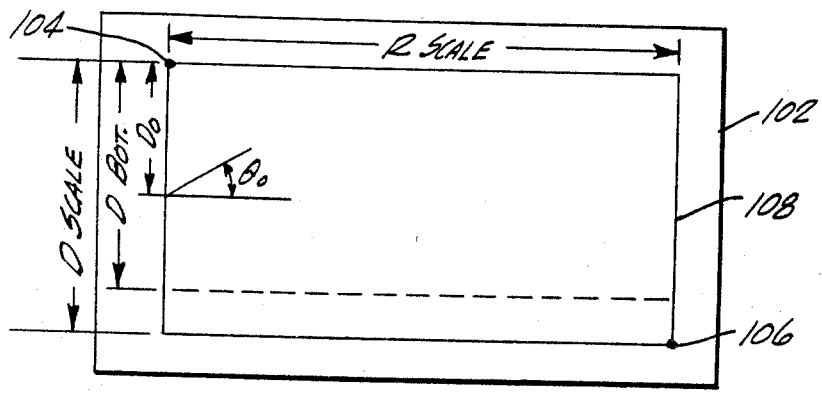
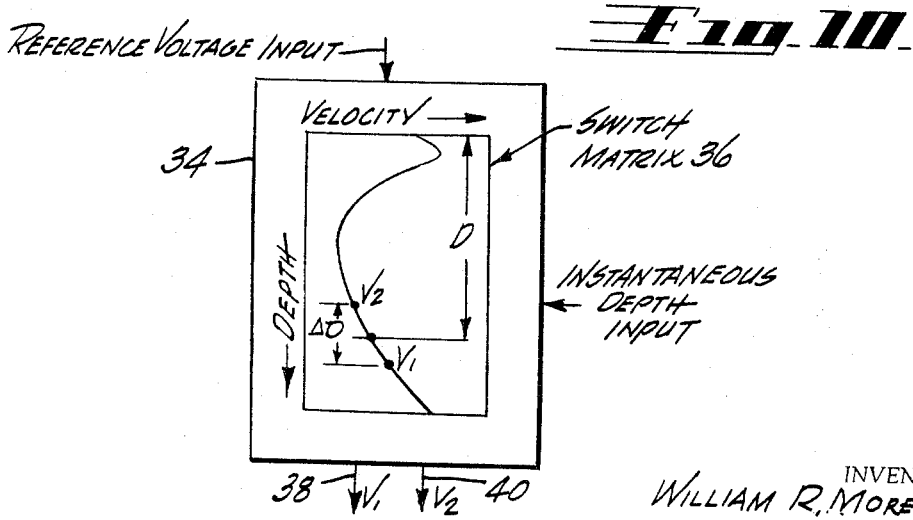

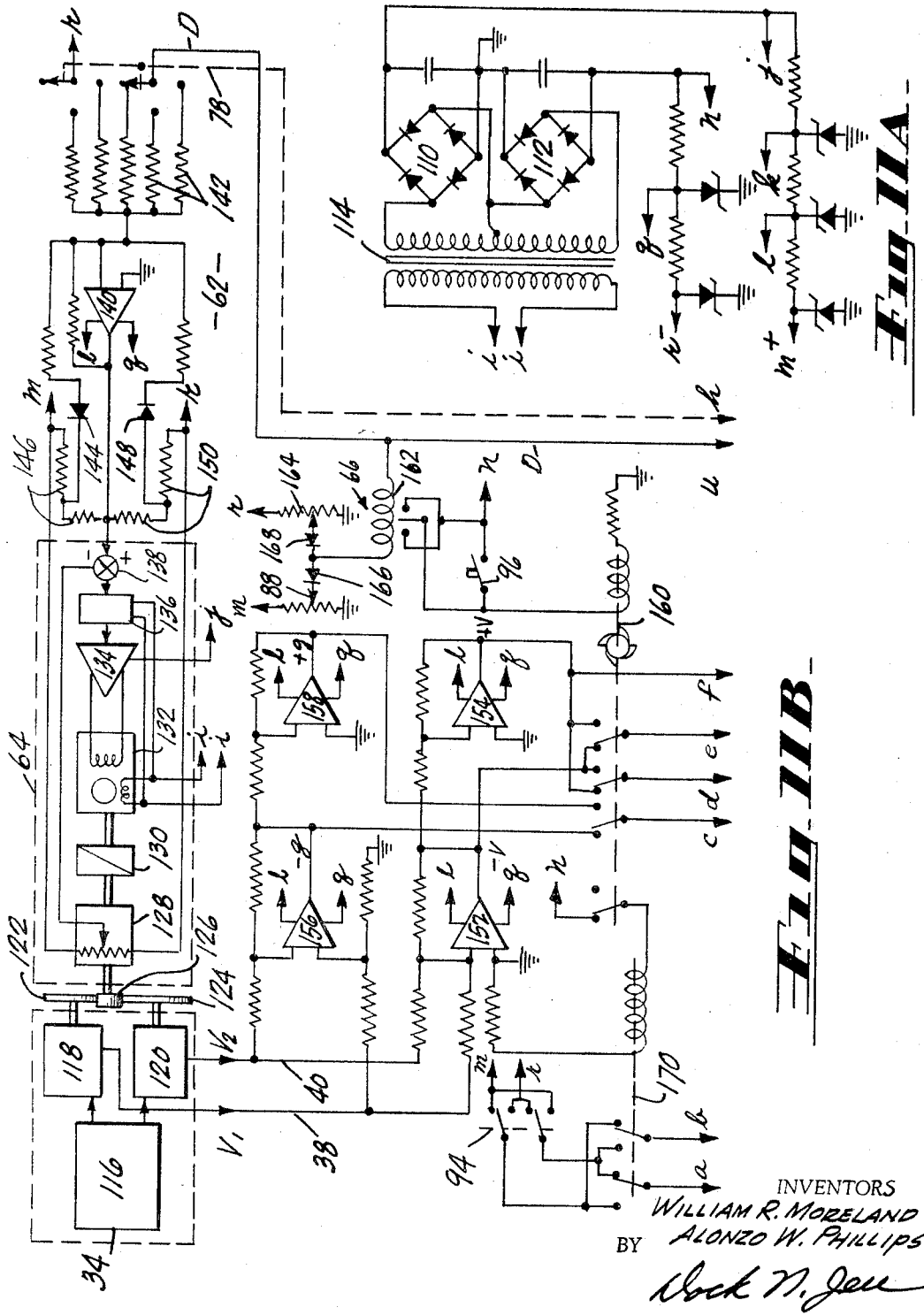

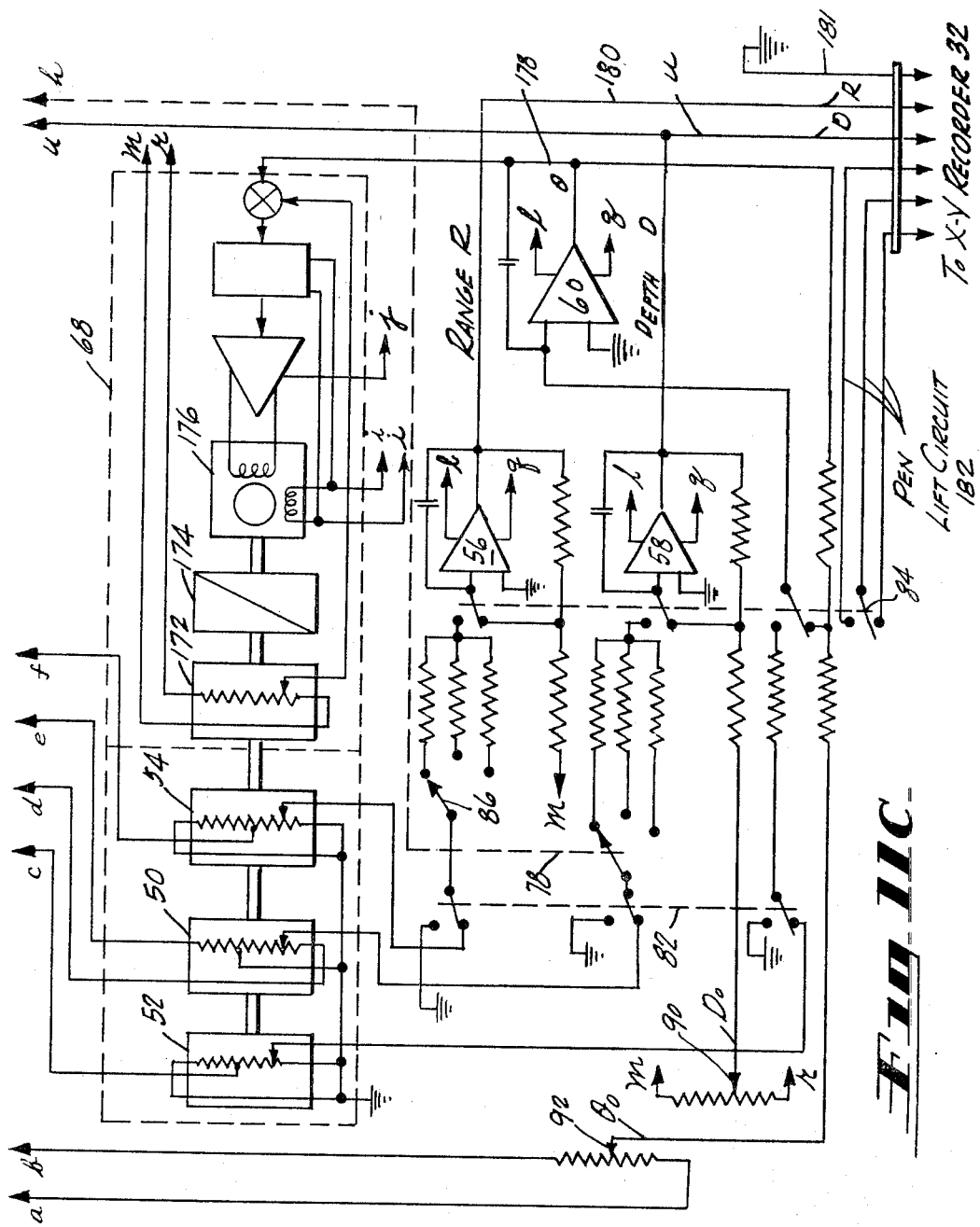

United States Patent Office 3,428,795
Patented Feb. 18, 1969

3,428,795
SONIC RAY TRACER
William R. Moreland, Torrance, and Alonzo W. Phillips, Azusa, Calif., assignors, by mesne assignments, to McDonnell Douglas Corporation, Santa Monica, Calif., a corporation of Maryland
Filed Dec. 28, 1964, Ser. No. 421,200
U.S. Cl. 235—184        14 Claims
Int. Cl. G06g 7/78

ABSTRACT OF THE DISCLOSURE

A sonic ray tracer including an analog computer having certain arrangements and combinations of regular computing components to provide a continuous solution to system equations derived on the basis of Huygens' principle on wave fronts, and an X–Y recorder which is driven by the output of the computer to plot accurate traces representing the continuous solution to the system equations.

---

Our present invention relates generally to sonar equipment and more particularly to a sonic ray tracer for quickly and accurately obtaining a ray pattern plot based upon the temperature versus depth profile of any selected location of, for example, the ocean.

Means for rapidly obtaining an accurate plot of the sonic ray pattern in any given area of the ocean is extremely desirable with sonar detection equipment. As is well known in the operation of sonar equipment, various "silent" or "shadow" zones are produced due to variations of acoustic velocity in the seawater medium causing sonic wave fronts to distort in intricate patterns. A submarine which positions itself in these silent or shadow zones greatly reduces the probability of its detection by sonar equipment. These zones can, however, be eliminated by proper positioning of the sound source if it is known what the ray pattern in the ocean would be for any given location of the sound source. Of course, such a ray pattern determination must be rapidly and accurately obtainable.

It is an object of our invention to provide means which can quickly and accurately obtain a ray pattern plot of sonic rays emanating from a sound source located at any position in a fluid medium.

Another object of this invention is to provide a sonic ray tracer which is small, lightweight and not complex in structure or operation for obtaining a ray pattern plot.

A further object of this invention is to provide a sonic ray tracer which has a novel construction yielding great versatility of use of the device.

A still further object of the invention is to provide a sonic ray tracer which is reliable in operation and provides rapid and accurate ray pattern plots with a minimum of operating components.

Broadly, and in general terms, the foregoing and other objects are preferably accomplished by providing a sonic ray tracer comprising an analog computer and an X–Y recorder which is driven by the output of the computer. The sonic ray tracer is particularly novel in that it has been developed on the basis of Huygens' principle on wave fronts whereas ray tracers in the past in general have been based on Snell's law, which produce accurate plots but are very laborious to use. Our sonic ray tracer also includes novel arrangements and combinations of computing components to accomplish various operations required in the device.

Figure 1:
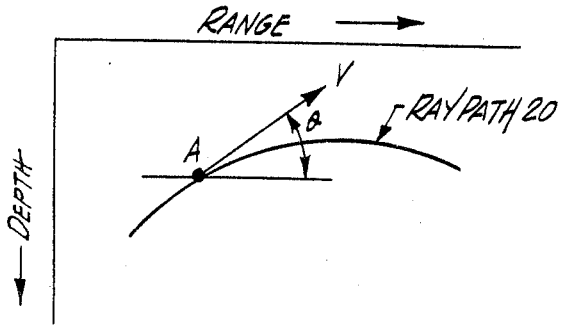
Figure 2:
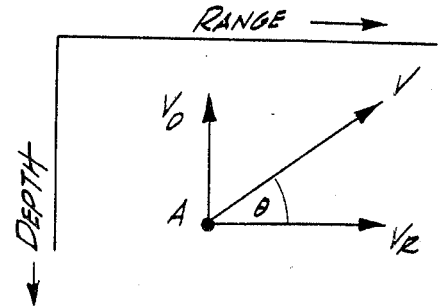
Figure 5:
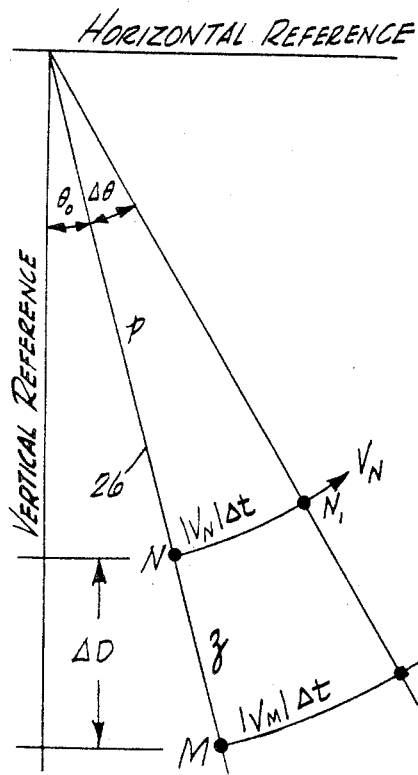
Figure 4:
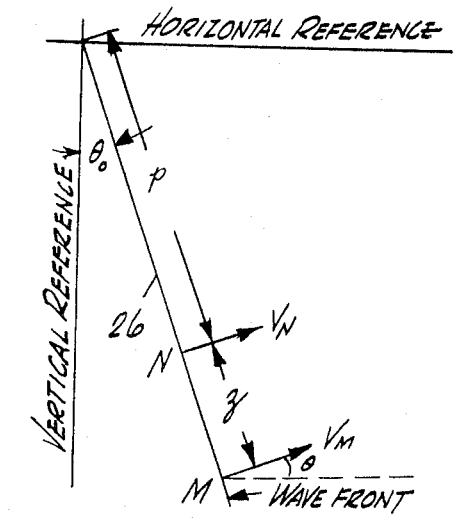
Figure 3:
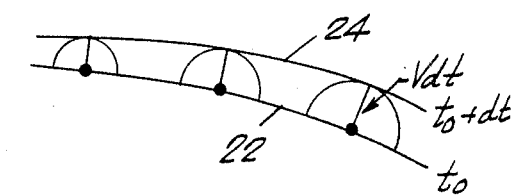
Figure 6:
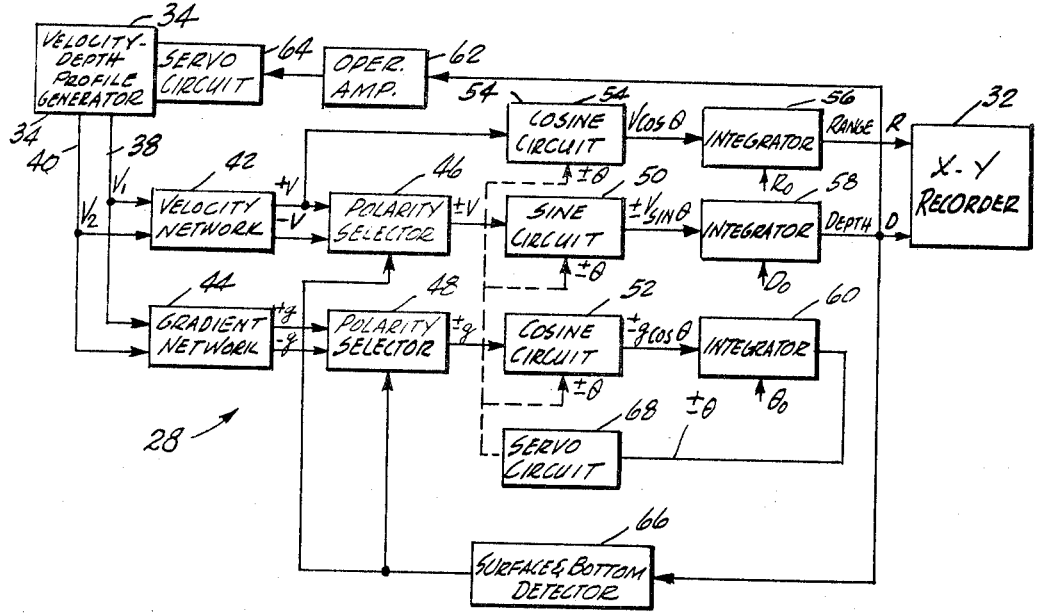
Figure 8:
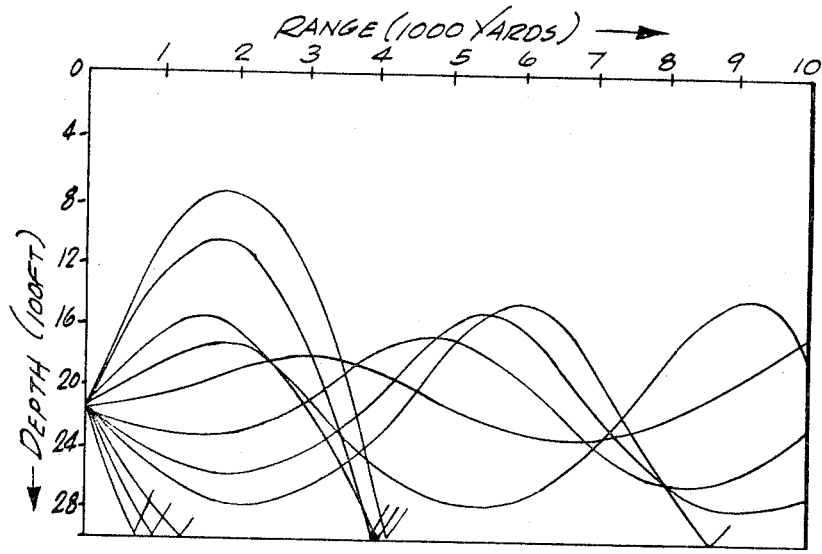

Our invention will be more fully understood and other features and advantages thereof will become apparent from the following detailed description of an illustrative embodiment of the invention, to be taken in conjunction with the accompanying drawings, in which:

FIGURE 1 is a graph showing a velocity vector considered in connection with a plotted ray path;
FIGURE 2 is a graph showing the resolution of the velocity vector into range and depth components;
FIGURE 3 is a diagrammatic plot of the movement of a wave front to illustrative Huygens' principle;
FIGURE 4 shows a plot of an arbitrary wave front for explaining Huygens' principle;
FIGURE 5 shows the movement of the wave front in accordance with Huygens' principle for ray angle derivation purposes;
FIGURE 6 is a functional block diagram of the sonic ray tracer;
FIGURE 7 is a drawing which schematically illustrates the velocity-depth profile generator used in this invention;
FIGURE 8 is a graph showing a typical ray pattern plot;
FIGURE 9 is a perspective drawing of the sonic ray tracer;
FIGURE 10 is a darwing of the graph paper used in the invention; and
FIGURES 11A, 11B and 11C, together, show a detailed circuit diagram of an illustrative embodiment of the computer portion of the sonic ray tracer.

As is well known, a wave front is any surface locating energy points of equal phase, and a ray path describes the motion of the energy accorded to a particular point on this wave front. In underwater acoustics, ray paths are usually designated as sonic rays and these rays are almost always bent when traveling through seawater, for example. Variations of ray direction from a straight line are due to propagation velocity changes in the seawater medium. These changes can occur either within a single medium or at interfaces between mediums of contrasting velocities. Within a single and continuous medium such as seawater, the velocity variation can be described in terms of the velocity gradient which generally expresses the dependence of velocity of propagation upon depth.

FIGURE 1 illustrates a ray path 20 within a coordinate system wherein depth increases from top to bottom and range increases from left to right as indicated. At an arbitrary point A on the ray path 20, the instantaneous velocity vector $\overline{V}$ is tangent to the ray path 20 at the point A. This vector $\overline{V}$ can be described in polar coordinates in terms of its magnitude V and an angle of inclination $\theta$ measured from the horizontal, as $V \angle \theta$.

FIGURE 2 shows the vector $\overline{V}$ resolved into its horizontal and vertical components which are velocities at point A in the range and depth directions, respectively. From FIGURE 2, it can be seen that $$V_R = \dot{R} = V \cos \theta \qquad \text{(Eq. 1)}$$
$$V_D = \dot{D} = V \sin \theta \qquad \text{(Eq. 2)}$$

where $V_R$ and $V_D$ are the range and depth velocities $\dot{R}$ and $\dot{D}$, respectively, at point A.

The instantaneous range R and depth D are obtained by integrating Equations 1 and 2 with respect to time, $$R = R_0 + \int_{t_0}^{t} \dot{R}\, dt$$
$$= R_0 + \int_{t_0}^{t} V \cos \theta\, dt \qquad \text{(Eq. 3)}$$
$$D = D_0 + \int_{t_0}^{t} \dot{D}\, dt$$
$$= D_0 + \int_{t_0}^{t} V \sin \theta\, dt \qquad \text{(Eq. 4)}$$

where $R_0$ and $D_0$ are initial range and initial depth, respectively.

The unknown quantity in Equations 3 and 4 is $\theta$, the instantaneous angle of inclination. To obtain an equation for this quantity, application is made of Huygens' principle which states that a wave front at some later time $t=t_0+dt$ can be determined by considering the effect produced by each point on a wave surface at a given time $t=t_0$ acting as a secondary source.

FIGURE 3 illustrates Huygens' principle. Each point on the wave front 22 produces a wavelet propagating outwards with the velocity $v$ at that point. The resultant wave front 24 at some later time $t=t_0+dt$ will be the envelope of all of the wavelets taken at that time. If the velocity $v$ function varies reasonably slowly over the wave front, the wave surface at time $t=t_0+dt$ will be defined approximately by the normals $vdt$ to the original wave front 22 as shown in FIGURE 3.

FIGURE 4 shows an arbitrary wave front 26 rotated at an angle $\theta$ from the vertical at time $t_0$. Two arbitrary points M and N are selected on the wave front 26 where the velocities are $\overline{V}_M$ and $\overline{V}_N$, respectively, and the magnitude of velocity $\overline{V}_M$ is greater than that of the velocity $\overline{V}_N$. The velocity vector $\overline{V}_N$ is displaced a distance $p$ from the origin along the wave front 26, and the perpendicular distance between the vectors $\overline{V}_M$ and $\overline{V}_N$ is $z$, where $z$ is a very short distance.

FIGURE 5 depicts the change in conditions at time $t_0+dt$. In accordance with Huygens' principle, point M has now progressed a distance $|\overline{V}_M|\Delta t$ to point $M_1$ and point N has advanced a distance $|\overline{V}_N|\Delta t$ to point $N_1$. During the time $\Delta t$, the wave front 26 has swept out an angle $\Delta\theta$. For a small angle $\Delta\theta$, $|\overline{V}_M|\Delta t$ and $|\overline{V}_N|\Delta t$ can be assumed to be arc lengths of circles described by radii $p+z$ and $p$, respectively.

For circular arc length, it is well known that $$S=R\theta \qquad \text{(Eq. 5)}$$

where S is arc length, R is the radius and $\theta$ is the angle in radians.

Thus, in FIGURE 5, $$|\overline{V}_M|\Delta t=(p+z)\Delta\theta \qquad \text{(Eq. 6)}$$

$$|\overline{V}_N|\Delta t=p\Delta\theta \qquad \text{(Eq. 7)}$$

Subtracting Equation 7 from Equation 6, $$\Delta V \Delta t = z\Delta\theta \qquad \text{(Eq. 8)}$$

where $\Delta V=|\overline{V}_M|-|\overline{V}_N|$, or $$\frac{\Delta\theta}{\Delta t}=\frac{\Delta V}{z} \qquad \text{(Eq. 9)}$$

Taking the limit of Equation 9 as $t \to 0$, $$\frac{d\theta}{dt}=\dot\theta=\frac{\Delta V}{z} \qquad \text{(Eq. 10)}$$

since $\Delta V$ and $z$ are independent of time.

Defining the velocity gradient $g$ as $$g=\frac{\Delta V}{\Delta D} \qquad \text{(Eq. 11)}$$

where $\Delta D$ is the small difference in depth from point M to point N, then from FIGURE 5, $$z=\frac{\Delta D}{\cos\theta} \qquad \text{(Eq. 12)}$$

Substituting Equation 12 into Equation 10, $$\dot\theta=\frac{\Delta V}{\Delta D}\cos\theta=g\cos\theta \qquad \text{(Eq. 13)}$$

The instantaneous ray angle $\theta$ can then be expressed as the integral of Equation 13, $$\theta=\theta_0+\int_{t_0}^{t} g\cos\theta\, dt \qquad \text{(Eq. 14)}$$

where $\theta_0$ is the initial ray angle.

FIGURE 6 shows a functional block diagram of our sonic ray tracer 28. The sonic ray tracer 28 system broadly comprises a computer 30 and a recorder 32 which is controlled by the output of the computer 30. The computer 30 is a ray computer for providing a continuous solution of the three system Equation 3, 4 and 14 given above. Prior to operation of the system, however, a velocity-versus-depth function must be obtained. This is ordinarily done by making temperature measurements of the water for various depths at the sound source location and converting this data into a velocity-depth profile curve. The bathythermograph shown, described and claimed by Wallace R. Spark in a copending patent application Ser. No. 354,325, filed Mar. 24, 1964, now Patent 3,273,393, can, for example, be used for this purpose.

FIGURE 7 schematically shows the computer's velocity-depth profile generator 34. Once the velocity-depth profile curve has been determined as by the bathythermograph mentioned above, the curve can be set into the profile generator 34 through a switch matrix 36 which is calibrated in velocity and depth coordinates. The instantaneous depth signal D which has been computed in the system is fed into the generator 34 as indicated in FIGURE 7. This signal causes the curve to be scanned at two levels $$D-\frac{\Delta D}{2}$$

and $$D+\frac{\Delta D}{2}$$

where $\Delta D$ is the small depth separation of the two points M and N as indicated in FIGURES 5 and 7. The resultant outputs of the generator 34 are two analog velocity signals $V_1$ on lead 38 and $V_2$ on lead 40.

As shown in FIGURE 6, two computing networks 42 and 44 accept the signals $V_1$ and $V_2$ as input signals to determine the average velocity V at the depth D, and the instantaneous velocity gradient $g$. Both positive and negative values of the velocity and gradient signals V and $g$ are obtained through use of a single profile generator 34, and these signals are continuously available for polarity changes of depth and ray angle when reflections occur.

The velocity and gradient signals are provided to respective polarity selectors 46 and 48, and the outputs of the selectors 46 and 48 are fed to sine circuit 50 and cosine circuit 52, respectively. The positive velocity signal $+V$ is further fed to cosine circuit 54 as illustrated in FIGURE 6. The output of the cosine circuit 54, $V\cos\theta$, is integrated by integrator 56 and added to the initial range $R_0$ which is set into the integrator 56 as indicated. The output of the integrator 56 produces the instantaneous range R which is provided to the X-Y recorder 32. The output of sine circuit 50, $+V\sin\theta$, is similarly intergated by integrator 58 and summed with the initial depth $D_0$ to produce the instantaneous depth D which is also provided to the X-Y recorder 32.

The depth signal D is fed back to an operational amplifier 62 which drives servo circuit 64. The servo circuit 64 adjust the profile generator 34 so as to keep velocity scanning coincident with the instantaneous depth. This signal D is also provided to a surface and bottom detector 66. When the depth signal D voltage equals the analog levels corresponding to the surface and bottom of that portion of the ocean, for example, at which the velocity-depth profile curve shown in FIGURE 7 was obtained, the detector 66 responds by actuating the polarity selectors 46 and 48 to change the polarity of the depth velocity and gradient or ray angle thus effecting a ray reflection.

The velocity gradient signal $g$ applied to the cosine circuit 52 produces an output signal $\pm g\cos\theta$ which is integrated by integrator 60 and added to the initial ray angle $\theta_0$ which is set into the integrator 60 as indicated in FIGURE 6. The output of the integrator 60 is thus the analog of the instantaneous ray angle $\theta$. This signal $\theta$ is fed to servo circuit 68 which mechanically adjusts the sine and cosine circuits 50, 52 and 54 to the instantaneous ray angle $\theta$. The sine and cosine circuits 50, 52 and 54 are, for example, conventional sine and cosine wound potentiometers in which the wipers thereof can be driven to positions corresponding to the various angles.

The range and depth signals R and D represent solutions of Equations 3 and 4, and are applied to a conventional X-Y recorder 32 for plotting and displaying selected ray paths. The X-Y recorder 32 can be, for example, a Model 200 X-Y Recorder manufactured by Electro Instruments, Inc. A pattern of sonic rays is obtained by sequencing the initial angle $\theta_0$ to various selected angles for each ray to be plotted.

FIGURE 8 shows a typical pattern of plotted ray paths. Only several representative ray paths are shown. The sonic source for this pattern is located at an initial depth of approximately 2200 feet and bottom is at approximately 3000 feet where ray reflections can occur. Initial range is, of course, zero which is normally invariable. The initial angle $\theta_0$ can be varied from 0 to 15 degrees and a ray pattern of fifteen rays can be provided in about two to three minutes. Approximately one minute of this time is used to preset the velocity-depth profile generator 34.

FIGURE 9 shows a perspective view of the sonic ray tracer 28. The computer 30 is mounted in a carrying case 70 approximately 10 inches high, 16 inches long and 9 inches wide. The computer 30 has a gross weight of about 40 pounds. The computer 30 operates on either 60 c.p.s. or 400 c.p.s., 115 volts power. When the power source supplies 60 c.p.s. power, a converter 72 is utilized. The converter 70 is conventional, of course, and will not be shown subsequently in the circuit diagram of the computer 30 for greater clarity of illustration of the invention.

A portion of the profile generator 34 is located centrally in the lower section of the carrying case 70 as shown. There are, for example, 34 slider switches 74 which can be moved in parallel slots running between front and rear sides of panel 76 as viewed in FIGURE 9. Thus, the front edge of the panel 76 corresponds to the abscissa axis for depth which increases from left to right and the left edge of the panel 76 corresponds to the ordinate axis for velocity which increases from front to rear. By moving the slider switches 74 in their respective parallel slots, the velocity-depth profile curve shown in FIGURE 7 can be closely approximately by a series of 33 straight lines if all of the slider switches 74 are employed.

The ordinate axis of the panel 76 is calibrated from for example, 4800 to 5000 feet per second in 2 feet per second intervals. The calibration of the abscissa axis is, however, dependent upon the setting of the depth scale switch 78 shown in FIGURE 9. If the depth scale switch 78 is set to the position labeled 30×10 (300 feet) the abscissa axis is calibrated from 0 to 300 feet in 10 feet increments corresponding to slider switches numbered 1 to 31 wherein slider switch number 1 corresponds to 0 feet depth, switch number 2 corresponds to 10 feet, etc., and switch number 31 corresponds to 300 feet depth.

If the depth scale switch 78 is set to either positions 30×100 (3000 feet) or 30×1000 (30,000 feet), the abscissa axis is calibrated from 0 to 3000 feet in 100 feet increments corresponding to slider switches numbered 1 to 31 wherein slider switch number 1 corresponds to 0 feet, switch number 2 corresponds to 100 feet, etc., and switch number 31 corresponds to 3000 feet. When the depth scale switch 78 is set to 30×1000 (30,000 feet) velocity versus depth information established on the panel 76 can be the velocity-depth profile from 0 to 3100 feet only, as set up by slider switches numbers 1 through 32.

The last two slider switches numbers 31 and 32 are used to establish the velocity information from 3000 to 30,000 feet when it is assumed that temperature or velocity does not vary significantly below 3000 feet. In this instance, the remaining slider switches numbers 33 and 34 are not needed or used at all to establish the profile curve below 3000 feet. The signals $V_1$ and $V_2$ (FIGURE 7) will remain those for the depth D of 3000 feet. The slider switch number 32 is set only because the wipers of two interpolating potentiometers in the profile generator 34 are relatively spaced with respect to each other as explained below.

Generally, the profile generator 34 comprises a function generator and two interpolating potentiometers. The function generator is, for example, a Model DC 250 Function Assembly manufactured by the Perkin-Elmer Corporation. A reference voltage is applied to a series of precision resistors (not shown) in the function generator and these resistors divide the applied voltage into 1% increments thus producing 101 voltage steps. Each voltage produced by the series resistors is applied to separate contacts in each slider switch 74 which has 101 positions.

Each slider switch 74 represents a particular ocean depth and the slider of each switch can be positioned to the voltage proportional to the velocity of sound at that depth. The output of each switch 74 is connected through its slider to respective taps of each interpolating potentiometer. Thus, corresponding taps of their respective potentiometers will be at the same voltage proportional to the velocity of sound at the depth of its corresponding slider switch 74.

The mechanical positions of the wipers of the two potentiometers for any particular depth are each displaced a small predetermined amount from the position which corresponds to the same depth as that of the particular slider switch 74 which connects with the corresponding tap of each of the two potentiometers. The wipers of the two potentiometers are actually spaced relatively with respect to each other such that a voltage difference proportional to a depth ΔD as indicated in FIGURE 7 is obtained. The output voltages from the two interpolating potentiometers are, of course, $V_1$ and $V_2$.

The interpolating potentiometers are, for example, Model 2X5 Vernistats manufactured by the Perkin-Elmer Corporation. The drive shafts of both potentiometers are driven simultaneously such that their output voltage difference is kept fixed at the value proportional to ΔD mentioned above. The Vernistats maintain a linear output voltage relationship between adjacent or successive taps such that the depth versus velocity curve can be effectively approximated by a series of 33 straight lines if all of the slider switches 74 are used.

The velocity of sound actually varies quite rapidly with both depth and time near the surface of the ocean but is fairly constant at the greater depths. Consequently, with a fixed number of straight lines available for approximating the depth versus velocity curve, it is desirable to use many short lines near the surface and few long lines at the greater depths. Thus, only the slider switches numbers 32, 33 and 34 are used to determine the velocity information on the panel 76 from 3000 to 30,000 feet when the depth scale switch 78 is set to its 30×1000 setting. The slider switches numbers 32, 33 and 34 are not used for the other two scales and never have any effect since ocean bottom would be above the depths corresponding to these slider switches for such other scales. Of course, as mentioned above, the slider switches numbers 33 and 34 need not be used at all if it is assumed that temperature or velocity does not vary much below 3000 feet.

Other control elements shown in FIGURE 9 include power switch 80 which applies operating power to the computer 30, calibrate switch 82 which is used to calibrate the X-Y recorder 32, mode switch 84 which controls the computing sequence of the unit, range scale switch 86 which determines the range the sonic rays are plotted, bottom select control 88 which is used to set the bottom depth in cooperation with the depth scale switch 78, initial depth control 90 which is used to select the depth of the sound source to be simulated, initial angle control 92 which is used to select the magnitude of the initial angle $\theta_0$ of the ray to be plotted, polarity switch 94 which determines the polarity of the initial angle selected by the initial angle control 92, and reflect switch 96 which may be operated at any time during computation to simulate a mirror reflection of a ray path.

The power switch 80 can be placed from an off position to either a 400 c.p.s. position or 60 c.p.s. position. These positions are selected according to the availability of 115 volts, 400 c.p.s. power. As mentioned previously, the converter 72 is used with 60 c.p.s. power but not with the 400 c.p.s. power. Power is supplied to computer 30 on cable 98 and to recorder 32 on cable 100.

The calibrate switch 82 illustratively has two positions in this exemplary embodiment of our invention. When the switch 82 is placed in the operate position, the computer 30 is put in the mode selected by mode switch 84. The mode switch 84 can be placed in either a reset or compute position. The computer 30 is placed in a standby state and initial conditions may be adjusted on the sonic ray tracer 28. When the switch 84 is placed in the compute position, a ray path computation is initiated and the result will be immediately displayed on the X–Y recorder 32. The mode switch 84 also causes the recorder pen to lift from the paper on the recorder 32 when the switch 84 is placed in the reset position.

FIGURE 10 shows the graph paper 102 which is used with the X–Y recorder 32. Placing the calibrate switch 82 in the calibrate position will cause the recorder pen of the X–Y recorder 32 to move to the upper left corner 104 or lower right corner 106 of the rectangle 108 on the paper 102. The depth D scale and the range R scale are indicated as shown with depth increasing from zero (surface) down and range increasing from zero to the right. The initial angle $\theta_0$ of the ray to be plotted, and bottom depth D Bot. are also indicated thereon.

The initial angle control 92 selects the magnitude of the initial angle $\theta_0$ for the ray to be plotted. The control 92 can be adjusted to markings to select an initial angle $\theta_0$ anywhere from, for example, 0 to 15 degrees. The polarity switch 94 determines the polarity of the initial angle $\theta_0$. Polarity is positive measured clockwise from the horizontal at initial depth $D_0$ as indicated in FIGURE 10. The initial angle $\theta_0$ is negative when measured counterclockwise from the horizontal.

When the polarity switch 94 is placed in positive position, the initial angle $\theta_0$ will have positive polarity. With the calibrate switch 82 also in the calibrate position, the recorder pen will move to the upper left corner 104. When the polarity switch is placed in the negative position, the initial angle $\theta_0$ will have negative polarity. With the calibrate switch 82 also in its calibrate position, the recorder pen will move to the lower right corner 106. The X–Y recorder 32 scale and zero controls are adjusted as the polarity switch 94 is altered between the positive and negative positions until the recorder pen coincides with corners 104 and 106, respectively.

The bottom select control 88 sets the bottom depth (D Bot. in FIGURE 10) to any depth between 150 and 300, 1500 and 3000, or 15,000 and 30,000 feet depending on the setting of the depth scale switch 78. When the ray path depth D reaches D Bot. a mirror reflection will result and the ray plot will continue. The initial depth control 90 selects the depth of the sound source to be simulated, which is the initial depth $D_0$ of the rays to be plotted. The control 90 may be set from 0 to 300, 3000, or 30,000 feet depending on the setting of the depth scale switch 78.

The depth scale switch 78 in FIGURE 9 has three positions labeled for 300, 3000 and 30,000 feet. This switch 78, (a) sets the depth scale (D scale in FIGURE 10) to be 300, 3000 or 30,000 feet, (b) sets the scale adjusted by the initial depth control 90 to be zero to 300, 3000 or 30,000 feet, (c) sets the scale adjusted by the bottom select control 88 to be 150 to 300, 1500 to 3000, or 15,000 to 30,000 feet, and (d) sets the scale of the depth axis or abscissa of the panel 76 for the function generator of the profile generator 34 to be zero to 300 or zero to 3000 feet. The scale of the depth axis of the function generator is zero to 3000 feet in both the 3000 and 30,000 feet positions of the depth scale switch 78 as mentioned before.

The range scale switch 86 has three positions labeled 10, 50, and 100 corresponding to ranges of 10,000, 50,000 and 100,000 yards, respectively. The settings of this switch 86 determines the range to which rays are to be plotted. The R scale in FIGURE 10 is thus established by this switch 86.

In operation, prior to connecting cables to power or the computer 30 and recorder 32, the power switch 80 is placed in its center off position and the mode switch 84 to its reset position. After connection of the cables, power is applied to the X–Y recorder 32 to allow it to warm up. A piece of graph paper similar to that shown in FIGURE 10 is then placed on the recorded 32.

With the mode switch 84 in its reset positon, the power switch 80 is actuated to apply power to the computer 30. The recorder pen will lift from the paper when the mode switch 84 is in the reset position. The calibrate switch 82 is then placed in its calibrate position and the recorder pen will move to the upper left corner 104 when the polarity switch 94 is in its positive position and to the lower right corner 106 when the switch 94 is placed in its negative position. The recorder 32 zero and scale controls should be adjusted until the pen position coincides with each corner as selected. The calibrate switch 82 is then returned to its operate position.

To accomplish ray plotting, the switches and controls are appropriately adjusted according to conditions. For example, it will be assumed that a velocity versus depth profile is as shown in FIGURE 7, bottom depth is 2000 feet, rays are to be plotted to 10,000 yards, and the sound source depth is 1000 feet.

The depth scale switch 78 is set to the smallest value exceeding to the bottom depth. For a bottom depth of 2000 feet, setting of depth scale should be at 3000 feet position of the switch 78. The velocity-depth profile is set into the panel 76 of the function generator as shown in FIGURE 9 by means of the slider switches 74 numbers 1 through 31.

The initial depth control 90 is adjusted until the recorder pen coincides with the bottom depth of, for example, 2000 feet as measured on the D scale in FIGURE 10. The bottom select control 88 is rotated from a maximum clockwise position in the counterclockwise direction until a reflect relay is heard to actuate within the computer 30. This is the setting for the bottom select control 88. Adjustment of the initial depth control 90 from minimum to maximum depth (0 to 3000 feet) should then cause the reflect relay to actuate as the recorder pen passes bottom depth (2000 feet). The bottom select control 88 should be readjusted, if necessary, such that actuation of the reflect relay does occur at the desired bottom depth.

The range scale switch 86 is set for the desired range of the ray plot, and is thus set at its 10,000 yards position. The initial depth control 90 is adjusted until the recorder pen coincides with the depth of the sound source to be simulated. This would be at 1000 feet for the conditions assumed above.

The magnitude of the initial angle $\theta_0$ desired is set by adjustment of the initial angle control 92 to the indicated angle marking, and the polarity switch 94 is set in its positive or negative position as desired. The mode switch 84 is then placed in its compute position to cause a ray trace to be plotted by the recorder 32. When the pen reaches the right margin of the rectangle 108 on the paper 102, the mode switch 84 is placed in its reset position to lift the pen off the paper. Additional ray plots can be obtained in similar manner by changing the setting of the initial angle control 92 and the position setting of the polarity switch as desired.

FIGURES 11A, 11B and 11C, together, illustrate the detailed circuitry of the computer 30. The detailed circuitry will be readily understood by bearing in mind the foregoing explanatory description. Leads or lines having the same or corresponding lower case letters at their ends are, of course, to be joined or connected together. Such connections would complete the interconnection of these three figures.

FIGURE 11A shows the power supply section for the computer 30. The section is substantially conventional and includes two full phase rectifiers 110 and 112 each having dropping resistors and regulating Zener diodes in their outputs to provide different voltages for the various computer components. Input power for the rectifiers 110 and 112 is obtained through a transformer 114 having a primary winding connected to a source providing 115 volts, 400 c.p.s. power to the leads $i$—$i$. A 115 volts, 60 c.p.s. power source is connected to the primary winding of transformer 114 through the converter 72 (not shown in FIGURE 11A) which converts the 60 c.p.s. power to 400 c.p.s. Positive output voltages are obtained from leads $j, k, l$ and $m$, and negative output voltages are obtained from leads $n, q$ and $r$. The voltages on lead $j, n, m$ and $r$ are, for example, $+28$ volts, $-28$ volts, $+10$ volts and $-10$ volts, respectively.

FIGURE 11B shows the velocity-depth profile generator 34 as including a function generator 116 and two interpolating potentiometers 118 and 120. The wipers of the potentiometers 118 and 120 are driven respectively by gears 122 and 124 which both mesh with gear 126 connected to the output of servo circuit 64. The servo circuit 64 is substantially conventional including a feedback potentiometer 128, gearing 130, servomotor 132 amplifier 134, chopper 136 and adder 138. The feedback potentiometer 128, gearing 130, and servomotor 132 amplifier 134, chopper 136 and adder 138. The feedback potentiometer 128, gearing 130, and servomotor 132 can be a type 8053–2 servo assembly manufactured by Beckman Instruments, Inc. The amplifier 134, chopper 136 and adder 138 can be a type 1950–11–0–30 amplifier assembly manufactured by George H. Philbrick Researches, Inc.

The input signal to the servo circuit 64 is from the operational amplifier 62 which includes an amplifier 140 having an input connected to scaling resistors 142, and also to its output through diode 144 and voltage divider 146, and diode 148 and voltage divider 150. The scaling or scale factor resistors 142 are provided to change the gain of the amplifier 140. The amplifier 140 can be a type P65 amplifier manufactured by George H. Philbrick Researches, Inc. The diodes and voltage dividers are provided to limit or clamp the output from the amplifier 140 and hence the input to the servo circuit 64 to a predetermined maximum value.

The purpose of this is to limit the movement of the wipers of the interpolating potentiometers 118 and 120 to positions corresponding to, for example, the 3000 feet depth where it is assumed that temperature or velocity does not vary significantly for greater depths and the last slider switches 74 numbers 33 and 34 are not used. Of course, such limiting means would be omitted where these last slider switches are used in establishing the profile curve at the greater depths.

The velocity signals $V_1$ and $V_2$ are applied to summing amplifiers 152 and 154 which produce output signals $-V$ and $+V$, respectively. The signal V is equal to the average of the sum of the two signals $V_1$ and $V_2$ or $\frac{1}{2}(V_1+V_2)$. The signals $V_1$ and $V_2$ are also applied to differential amplifiers 156 and 158 which produce negative and positive signals proportional to the difference of the two signals $V_1$ and $V_2$. By selecting appropriate values of circuit components, this difference will be divided by a signal equal to $\Delta D$. Thus, the outputs of the amplifiers 156 and 158 are negative and positive values of $$(V_1-V_2)/\Delta D$$

or $-g$ and $+g$. The velocity network 42 therefore includes the amplifiers 152 and 154, and the gradient network 44 therefore includes the amplifiers 156 and 158. These amplifiers are, of course, conventional in themselves.

The polarity selectors 46 and 48 shown in FIGURE 6 are, effectively, a ratchet relay 160. The poles of the relay 160 are moved from one set of contacts to the other each time the relay 160 is energized. Relay 160 is controlled by either control relay 162 or the reflect switch 96. The control coil of relay 162 is connected on one end to lead $u$ which carries the depth signal D and to the wipers of protentiometers 88 and 164 on the other end through suitably oriented diodes 166 and 168. The pole of the relay 162 is center-balanced and is actuated to one contact or the other according to the polarity of the signal D. The potentiometer 88 is for bottom select control and the potentiometer 164 is for surface select control. The settings of these two potentiometers will establish the magnitude that the depth signal D must be in order to actuate the relay 162 and thus energize the relay 160. The relay 162 in conjunction with the diodes 166 and 168 effectively comprise the surface and bottom detector 66.

Depressing the momentary pushbutton switch 96 will also energize the relay 160 and cause the poles thereof to be actuated from one set of contacts to the other. It can be seen that the signals on leads $c, d$ and $e$ will be reversed in polarity with each actuation of the relay 160. A relay 170 will also be alternately energized and de-energized with the actuation of the relay 160. Power obtained through the polarity switch 94 is reversed in polarity with the actuation of the relay 170.

FIGURE 11C shows the potentiometer 92 for initial angle control connected to the leads $a$ and $b$. The polarity of the initial ray angle $\theta_0$ is thus controlled by the switch 94 and the relay 170 which is governed by the relay 160. Leads $c, d, e$ and $f$ connect the inputs of the sine and cosine circuits 50, 52 and 54 as shown. These circuits are conventional sine and cosine potentiometers as indicated in FIGURE 11C. It is apparent that the input signals to the sine potentiometer 50 and the cosine potentiometer 52 will be reversed in polarity with each actuation of the polarity select relay 160. The servo circuit 68 which drives the potentiometers 50, 52 and 54 is similar to the servo circuit 64 previously discussed. The sine and cosine potentiometers 50, 52 and 54 together with the feedback potentiometer 172 gearing 174 and servomotor 176 is, for example, a type 8053–1 Servo Assembly manufactured by Beckman Instruments, Inc.

Potentiometer 90 provides the initial depth control signal $D_0$ which is combined at the output of integrator 58, when the mode switch 84 is placed from the reset position shown in FIGURE 11C to its operate position. The output of the sine potentiometer 50 is applied to the input of the integrator 58 through the calibrate switch 82 and the depth scale switch 78 contracts as shown when the mode switch 84 is in the operate position. Thus, the output of the integrator 58 is the instantaneous depth signal D which appears on the lead $u$ connecting with the input of the operational amplifier 62, the surface and bottom detector 66, and to the X-Y recorder 32. The calibrate switch 82 is shown in its operate position, and when it is in its calibrate position it can be observed that the inputs of the integrators 56, 58 and 60 are connected to ground with the mode switch 84 in its operate position.

The output of the cosine potentiometer 52 is applied to the input of the integrator 60 when the mode switch 84 is in its operate position. The initial angle $\theta_0$ is combined with the output of the integrator 60 and a signal for the instantaneous ray angle $\theta$ is obtained on lead 178. This lead 178 and hence the ray angle signal $\theta$ is connected to the input of the servo circuit 68.

The output of the cosine potentiometer 54 is applied to the input of the integrator 56 through the range scale switch 86 when the mode switch 84 is in its operate position. Since initial range $R_0$ is that of the sound source, $R_0$ is necessarily zero under normal circumstances and an adjustable initial range signal is not required for combination as in the other integrators 58 and 60. The instantaneous range signal R is obtained on lead 180 which is connected to the X-Y recorder 32.

Recorder 32 ground is provided by lead 181, and the three leads 182 are connected to the pen lift circuit in the X-Y recorder 32. As described previously, when the mode switch 84 is in the reset position shown, the recorder pen is lifted from the paper 102 mounted on the recorder 32. When the mode switch 84 is placed in its operate position, the pen lift circuitry in the recorder 32 places the recorder pen in contact with the recorder paper.

While some specific values and types of components have been given above in connection with an exemplary embodiment of our invention, such specific data is merely provided as examples only and are not intended to limit or restrict the scope of the invention. It is to be understood that the particular embodiment of our invention described above and shown in the drawings is merely illustrative of, and not restrictive on, our broad invention and that various changes in design, structure and arrangement may be made without departing from the spirit and scope of the appended claims.

We claim:

1. In a sonic ray tracer, computer means comprising:
a velocity-depth profile generator for providing first and second signals which are slightly different in value from each other and having an average value proportional to the velocity of sound at various depths of a fluid medium;
means for obtaining a first output signal proportional to the average value of said first and second signals, said first output signal being a velocity signal;
means for obtaining a second output signal proportional to the difference value of said first and second signals, said second output signal being a velocity gradient signal;
means for mutiplying said velocity signal with a cosine function of a ray angle and integrating the multiplied signal to produce a range output signal;
means for multiplying said velocity signal with a sine function of the ray angle and integrating the multiplied signal to produce a depth output signal; and
means for multiplying said velocity gradient signal with a cosine function of the ray angle and integrating the multiplied signal to produce a ray angle output signal for controlling the values of said three cosine and sine functions.

2. Apparatus as defined in claim 1 in which said means for integrating the multiplied signal to produce a depth output signal further comprising means for setting an initial value for said depth output signal thereof.

3. Apparatus as defined in claim 1 in which said means for integrating the multiplied signal to produce a ray angle output signal further comprising means for setting an initial value for said ray angle output signal thereof.

4. Apparatus as defined in claim 1 wherein said profile generator includes a function generator having an adajustable output, and first and second interpolating potentiometers with inputs connected to the output of said function generator and wipers driven in accordance with said depth output signal to produce respective output signals from said potentiometers differing in signal value from each other by a small predetermined amount.

5. Apparatus as defined in claim 1 in which said means for multiplying said velocity signal with a cosine function of a ray angle and integrating the multiplied signal to produce a range output signal further comprising means for varying said range output signal in accordance with a predetermined scale factor.

6. Apparatus as defined in claim 1 in which said means for multiplying said velocity signal with a sine function of the ray angle and integrating the multiplied signal to produce a depth output signal further comprising means for varying said depth output signal in accordance with a predetermined scale factor.

7. In a sonic ray tracer, computer means comprising:
a velocity-depth profile generator for providing first and second signals which are slightly different in value from each other and having an average value proportional to the velocity of sound at various depths of a fluid medium;
means for obtaining first positive and negative output signals each proportional to the average value of said first and second signals, said first output signals being velocity signals;
means for obtaining second positive and negative output signals each proportional to the difference value of said first and second signals, said second output signals being velocity gradient signals;
means for multiplying said first positive output signal with a cosine function of a ray angle and integrating the multiplied signal to produce a range output signal;
first polarity selector means for selecting one of said first positive and negative output signals;
second polarity selector means for selecting one of said second positive and negative output signals;
means for multiplying a selected one of said first output signals with a sine function of the ray angle and integrating the multiplied signal to produce a depth output signal;
detector means responsive to at least one predetermined value of said depth output signal for controlling the selection of said first and second polarity selectors; and
means for multiplying a selected one of said second output signals with a cosine function of the ray angle and integrating the multiplied signal to produce a ray angle output signal for controlling the values of said three cosine and sine functions.

8. Apparatus as defined in claim 7 in which said means for integrating the multiplied signal to produce a depth output signal further comprising means for setting an initial value for said depth output signal thereof.

9. Apparatus as defined in claim 7 wherein said profile generator includes a function generator having an adjustable output, and first and second interpolating potentiometers with inputs connected to the output of said function generator and wipers driven in accordance with said depth output signal to produce respective output signals from said potentiometers differing in signal value from each other by a small predetermined amount.

10. Apparatus defined in claim 7 in which said means for multiplying said first positive output signal with a cosine function of a ray angle and integrating the multiplied signal to produce a range output signal further comprising means for varying said range output signal in accordance with a predetermined scale factor.

11. Apparatus as defined in claim 7 in which said means for multiplying a selected one of said first output signals with a sine function of the ray angle and integrating the multiplied signal to produce a depth output signal further comprising means for varying said depth output signal in accordance with a predetermined scale factor.

12. Apparatus as defined in claim 7 wherein said first and second polarity selector means include first and second poles of a relay controlled by said detector means, said first pole being connected to said multiplying means used in producing a depth output signal and engaging one of a pair of contacts having said first positive and negative output signals applied respectively thereto, and said second pole being connected to said multiplying means used in producing a ray angle output signal and engaging one of a pair of contacts having said second positive and negative output signals applied respectively thereto, whereby said first and second poles are each actuated to engage one contact of their respective pairs of contacts for providing output signals of different polarity in accordance with the condition of said relay as controlled by said detector means.

13. Apparatus as defined in claim 7 in which said means for integrating the multiplied signal to produce a ray angle output signal further comprising means for setting an initial value for said ray angle output signal thereof.

14. Apparatus as defined in claim 13 in which said means for setting an initial value for said ray angle output signal further comprising means for setting the polarity of the initial value for said ray angle output signal.

References Cited
UNITED STATES PATENTS

| | | | |
|---|---|---|---|
| 2,925,217 | 2/1960 | Watt | 235—184 X |
| 2,942,782 | 6/1960 | Blizard et al. | 235—182 |
| 2,965,876 | 12/1960 | Meunier et al. | 235—184 X |
| 3,196,263 | 7/1965 | Marvin | 235—183 |
| 3,278,736 | 10/1966 | Pastoriza | 235—184 |

MALCOLM A. MORRISON, *Primary Examiner.*

FELIX D. GRUBER, *Assistant Examiner.*

U.S. Cl. X.R.

235—183, 197; 340—3